March 24, 1953 A. ELO 2,632,475
DIAPHRAGM ASSEMBLY
Filed June 6, 1946

INVENTOR.
Arpad Elo
BY
ATT.

Patented Mar. 24, 1953

2,632,475

UNITED STATES PATENT OFFICE 2,632,475

DIAPHRAGM ASSEMBLY

Arpad Elo, Milwaukee, Wis., assignor to Perfex Corporation, Milwaukee, Wis., a corporation of Wisconsin Application June 6, 1946, Serial No. 674,911

2 Claims. (Cl. 137—791)

The present invention relates generally to a diaphragm assembly of novel construction, and particularly to a diaphragm assembly which translates the volumetric expansion of a thermally responsive substance into linear movement of the flexible portion of the diaphragm. This resulting linear movement of the diaphragm may be used to actuate a control device, for instance, an electric switch.

The principal object of my invention is to provide a diaphragm assembly which efficiently translates the volumetric expansion of a thermally responsive substance into linear movement of the flexible portion of the diaphragm.

A further object of my invention is to accomplish the above with a minimum of stress on the parts of the diaphragm assembly, thus insuring maximum operating life.

A further object of my invention is to provide a diaphragm assembly whose parts are designed in such a manner as to permit a soldered joint between them without excess solder filling any portion of the chamber occupied by the thermally responsive substance.

A further object of my invention is to provide a diaphragm assembly in which the outer, flexible member is supported by a rigid, inner member having the same general configuration as the flexible outer member.

For a more complete understanding of my invention, reference should be made to the accompanying drawing, in which, Fig. 1 represents a top view of the diaphragm assembly;

Figure 1:
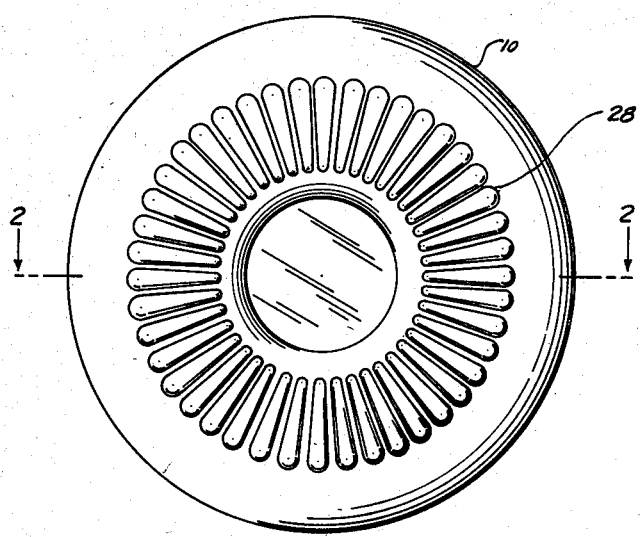

With reference to the drawing, the diaphragm assembly consists of a flexible, cup-shaped, outer member 10 and a rigid inner member 11, having the same general configuration as the outer member 10. The outer member 10 is shaped so as to form a curved intermediate portion 12 merging with an end wall 13 and an annular side wall 14. Near the curved intermediate portion 12 the inner member 11 is shaped so as to form projections 15 which serve to maintain a minimum space 16 between the inner and outer members 10 and 11.

Figure 4:
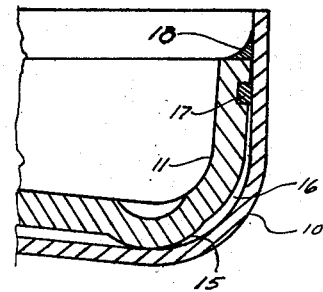
Fig. 4 represents an enlarged, fragmentary view, in section, of the soldered joint between the flexible outer member and rigid, inner member.
Figure 2:
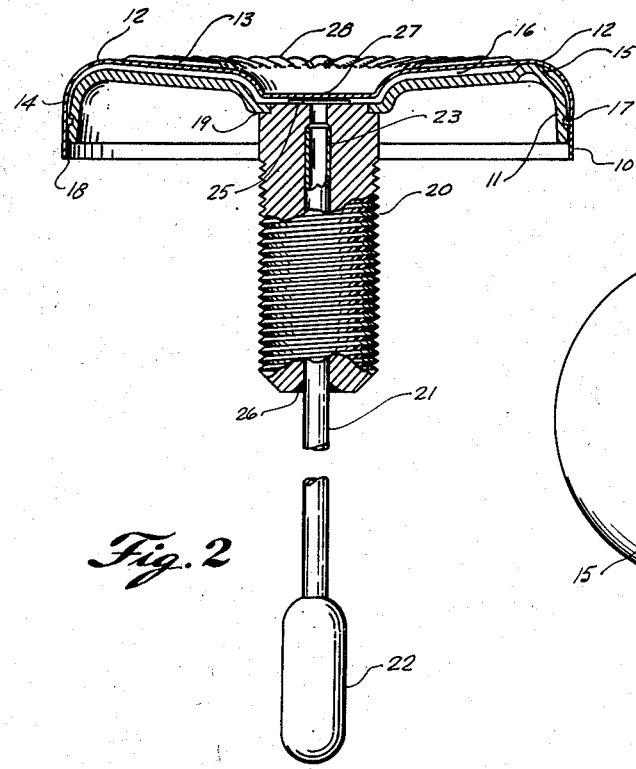
Fig. 2 represents a side view in section taken along line 2—2 of Fig. 1.
Figure 3:
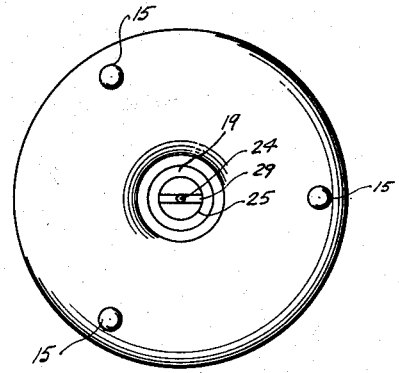
Fig. 3 represents a bottom view of the rigid, inner member joined to the threaded mounting plug.

The inner and outer members 10 and 11 are joined together as shown in Fig. 4. The inner member 11 is provided with an annular recess 17 facing the outer member 10. The inner and outer members 10 and 11 are joined by solder as as 18. The annular recess 17 serves to catch any excess solder from the soldered joint 18 and prevents it from entering the space 16.

The outer flexible member 10 is provided with radially extending stiffening ribs 28. These prevent bulging of the end wall 13 due to the high pressures within the diaphragm assembly, and cause any deflection of the outer member 10 to take place principally at the curved intermediate portion 12.

The rigid inner member 11 is fastened to a threaded mounting plug 20 at 19. A capillary tube 21 having a bulb 22 is inserted into a tubular opening 23 in the mounting plug 20. The capillary tube 21 is fastened to the mounting plug 20 by solder, as at 26. The cap member 25 has a small opening 24 extending through its center, and a slot 29 in its upper surface. The bulb 22, capillary tube 21, and space 16 are filled with a thermally responsive fluid preferably of the liquid type. A passage for the thermally responsive fluid from the opening 23 to the space 16 is provided by the small opening 24 in the cap member 25. The slot 29 in the cap member 25 allows this passage to remain open when the center portion 27 of the outer member 10 is resting against the upper surface of the cap member 25.

In operation, an increase in temperature in the region surrounding the bulb 22 results in expansion of the thermally responsive fluid. Since the center portion 27 of the outer member 10 is below the plane formed by the curved intermediate portion 12, initial expansion of the thermally responsive fluid will move the center portion 27 upwardly toward the plane of the curved intermediate portion 12. As this movement takes place the curved intermediate portion 12 flexes outward from its point of juncture with the inner member 11. Further expansion of the thermally responsive fluid results in the center portion 27 being raised above the plane of the curved intermediate portion 12. This causes the curved intermediate portion 12 to flex inward until its movement is stopped by the curved portion of the rigid inner member 11. Thus it may be seen that this initial outward flexing and subsequent inward flexing of the curved intermediate portion 12 allows a maximum linear movement of the center portion 27. This outward and inward movement of the curved intermediate portion 12 also put relatively small alternate compression and tension stress on the outer member 10 in the region of the curved intermediate portion 12 for a given linear movement of the center portion 27, thus increasing the operating life of the diaphragm.

It will be apparent to those skilled in the art that changes may be made in the form of the apparatus disclosed without departing from the spirit of my invention as set forth in the appended claims, and that certain features of my invention may sometimes be used to advantage without a corresponding use of other features.

What is claimed is:

1. A diaphragm assembly comprising, a relatively flexible cup-shaped outer member having a curved intermediate portion merging with an end wall and an annular side wall, a relatively rigid inner member within the outer member, said inner member having the same general configuration as the outer member and fitting closely therewith so as to limit the space between the members, the annular side wall of the outer member and the relatively rigid inner member being joined together by a soldered joint, said inner member being provided with an annular recess facing the side wall of the outer member for collecting any solder flowing between said members during the soldering operation.

2. A diaphragm assembly comprising, a relatively flexible cup shaped outer member having a curved intermediate portion merging with an end wall and an annular side wall terminating in a free margin, a relatively rigid inner member within the outer member, said inner member having the same configuration as the outer member and fitting closely therewith, the annular side wall of the inner member being shorter than the side wall of the outer member whereby to provide a ledge, the annular side wall of the outer member and the relatively rigid inner member being joined together by means of solder deposited along said ledge, one of said members having a recess adjacent the soldered joint and facing the other member, said recess serving to collect any solder flowing between the members during the solder operation.

ARPAD ELO.

REFERENCES CITED

The following references are of record in the file of this patent:

UNITED STATES PATENTS

| Number | Name | Date |
|---|---|---|
| 1,439,750 | Nelson | Dec. 26, 1922 |
| 1,527,102 | Wingfield | Feb. 17, 1925 |
| 1,793,621 | Kelley | Feb. 24, 1931 |
| 1,921,312 | Eichholz | Aug. 8, 1933 |
| 2,137,617 | Imes | Nov. 22, 1938 |
| 2,150,771 | Kollsman | Mar. 14, 1939 |
| 2,177,674 | Schweizer | Oct. 31, 1939 |
| 2,203,841 | Persons | June 11, 1940 |
| 2,296,435 | Giard | Sept. 22, 1942 |
| 2,331,464 | Fillo | Oct. 12, 1943 |
| 2,435,716 | Kearney | Feb. 10, 1948 |